J. D. ALLEN.
COMPENSATING DRIVING MECHANISM FOR MOTOR VEHICLES.
APPLICATION FILED MAR. 7, 1917.

1,265,160.

Patented May 7, 1918.
3 SHEETS—SHEET 2.

Inventor
John D. Allen,

Witness
Chas. L. Grieshauer.

By Howard A. Coombs
his Attorney

Inventor
John D. Allen,
By Howard A. Coombs
his Attorney ively driven in the direction in which
UNITED STATES PATENT OFFICE.

JOHN D. ALLEN, OF PHILADELPHIA, PENNSYLVANIA.

COMPENSATING DRIVING MECHANISM FOR MOTOR-VEHICLES.

1,265,160. Specification of Letters Patent. Patented May 7, 1918.

Application filed March 7, 1917. Serial No. 153,074.

*To all whom it may concern:*

Be it known that I, JOHN D. ALLEN, a citizen of the United States, residing at Philadephia, in the county of Philadelphia and State of Pennsylvania, have invented new and useful Improvements in Compensating Driving Mechanism for Motor-Vehicles, of which the following is a specification.

The present invention relates to the driving mechanism of motor vehicles, and more particularly to that part of the drive which is contained in the rear axle and which transmits the power "differentially" to the wheels, that is to say, in such a way that the outer wheel on a curve can turn faster than the inner wheel. My improved mechanism takes the place of the ordinary "differential" and possesses some very material advantages thereover, the principal of which are: a positive drive of both wheels under all conditions, so that one wheel cannot "spin" ahead of the other; elimination of all danger of skidding; total absence of friction between the various parts other than in the bearings; safety on grades, and simplicity and strength.

It is well known that "skidding" is one of the greatest bugbears of automobilists, and a prolific source of accidents. It is not the straight forward slide, upon sudden application of the brakes, which is so dangerous, but it is what may be called "circular skidding," that is, the sidewise swinging of the rear part of the vehicle when the brakes are applied, which is caused by the pivotal action of the gear differential. With the latter, it may even happen that one wheel turns forward while the other is turning backward, causing a bad "skid." In my axle, the inner wheel on a curve is always positively driven in the direction in which the vehicle is moving, and the other wheel is also positively driven as soon as the vehicle resumes a straight line, the drive being always positive, irrespective of the amount of load borne, or resistance encountered by the wheel.

The mechanism hereinafter described is a modification of those disclosed and claimed in my prior applications, Ser. No. 94,120, filed April 28, 1916, as a continuation, and patented September 4, 1917, as No. 1,238,730, and Ser. No. 123,474, filed October 3, 1916.

It is illustrated in the accompanying drawings, in which—

Figure 1:
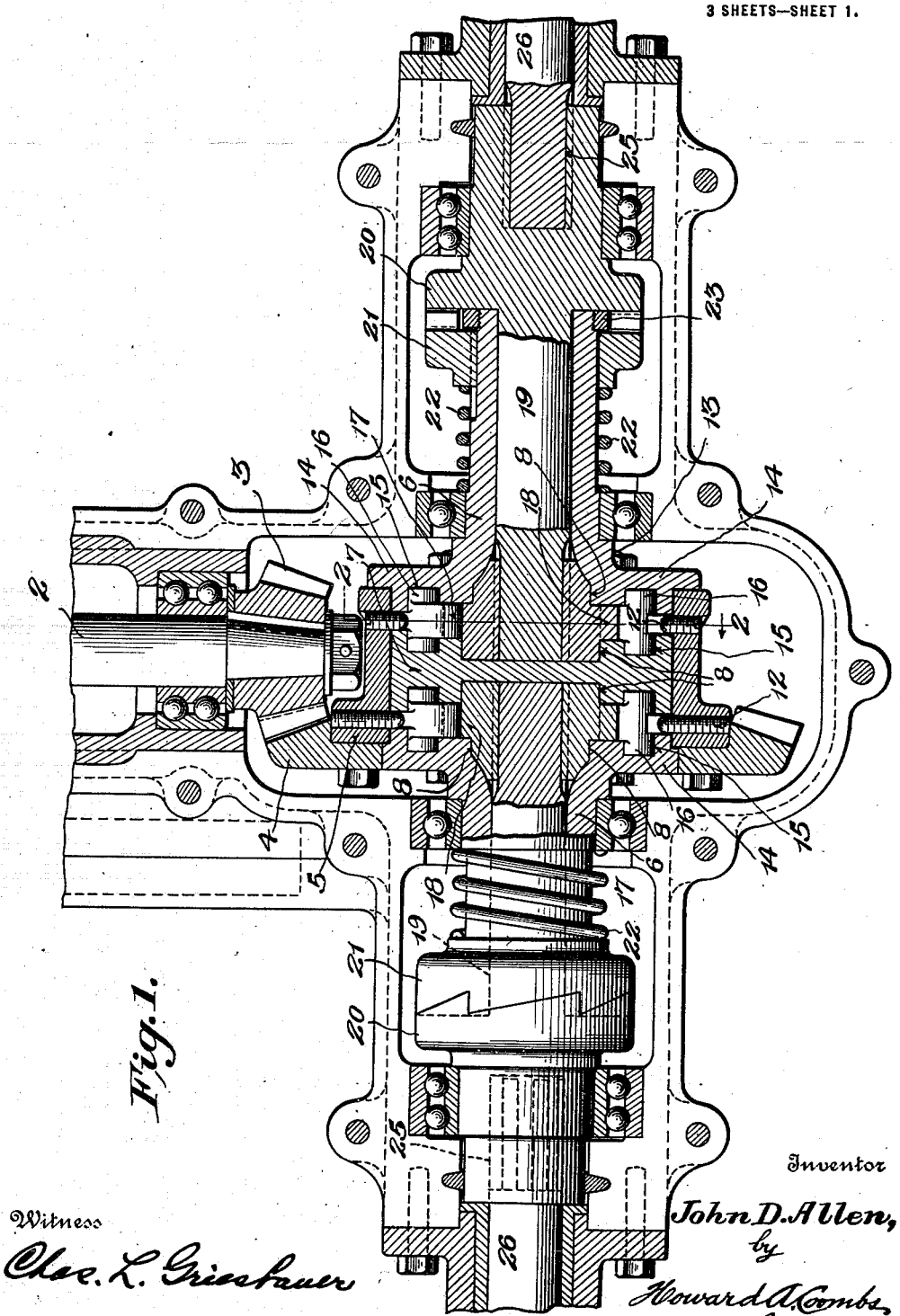
Figure 1 is a horizontal section through a motor vehicle rear axle containing my improved driving mechanism.

1 represents the lower half of the fixed axle of a motor vehicle, and 2 the power shaft carrying bevel pinion 3, meshing with bevel gear 4, the hub 5 of which is mounted on the central portion 7 of the main driving shaft 6, 6, 7, hereinafter described, and drives the same by means of the keys 9 engaging in grooves 10 in said driving shaft, the length of said grooves being somewhat greater than the thickness of said keys so that said gear has a limited turning movement on said driving shaft when it is reversed or when the shaft runs faster than the gear.

The hub 5 carries pins 12, screw-threaded into it and projecting inwardly therefrom, through slots in members 6, 6 and 7, for a purpose to be described.

The main driving shaft is built up of three parts, viz. two tubular sleeves 6, 6, flanged at their inner ends at 14, and a central web-like bearing member 7, rigidly secured to said flanges by bolts 13. The flanges and central member have alined sockets 15 for the reception of the trunnions 16 of pawls 17, which engage, on reverse drive, the teeth of two ratchet wheels 18, located between said flanges and central member and journaled on shoulders 8 of the same. Each wheel is splined on the end of one half of a divided driving shaft 19, 19, which is rotatably mounted within said sleeves 6, 6.

Each half shaft 19 extends beyond the end of the corresponding tubular sleeve 6, and is there enlarged and has fast on, or integral with, it a ratchet clutch member 20, the coöperating clutch member 21 being slidably splined on the end of said tubular sleeve and being pressed toward the member 20 by a spring 22. 23 are collars screwed onto the outer ends of the sleeves 6 to prevent clutch members 21 from moving too far outwardly.

The teeth of these ratchet clutches are so arranged that they can transmit power only when the main shaft 6, 6, 7, is being driven forwardly by the gear 4, or when the vehicle moves backwardly by gravity, and, of course, permit either wheel to overrun on a curve.

The half shafts 19 extend still farther outwardly and are each provided with an angular or splined socket 25 for the reception of the end of the correspondingly shaped wheel shaft 26.

Figure 2:
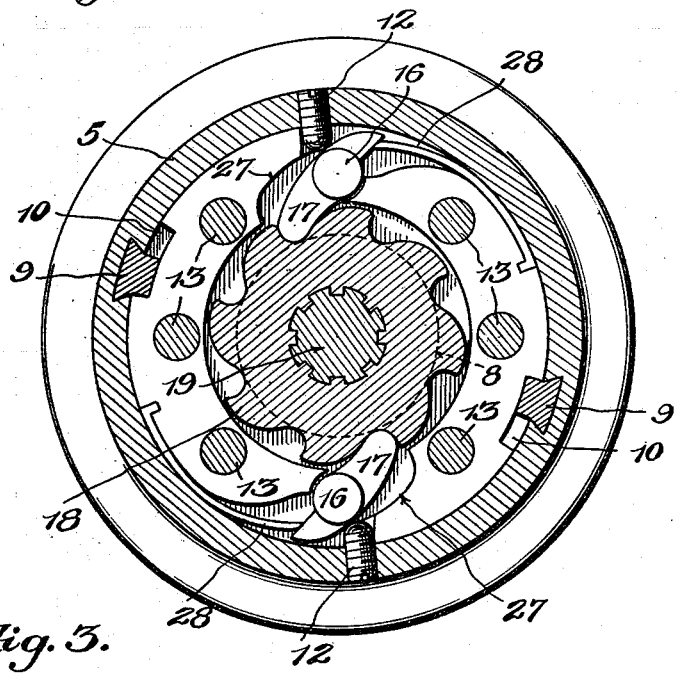
Fig. 2 is a cross-section taken on line 2—2 of Fig. 1.
Figure 3:
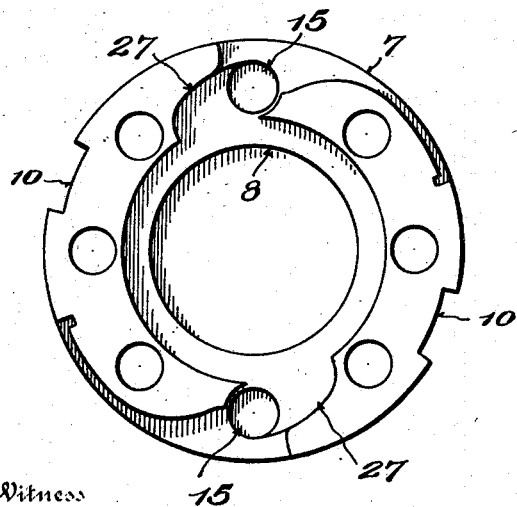
Fig. 3 is a face view of the central part of the hollow driving shaft.
Figure 4:
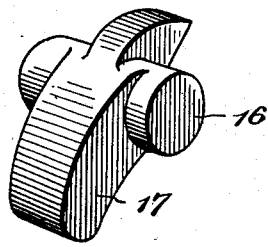
Fig. 4 is a perspective view of one of the pawls.
Figure 5:
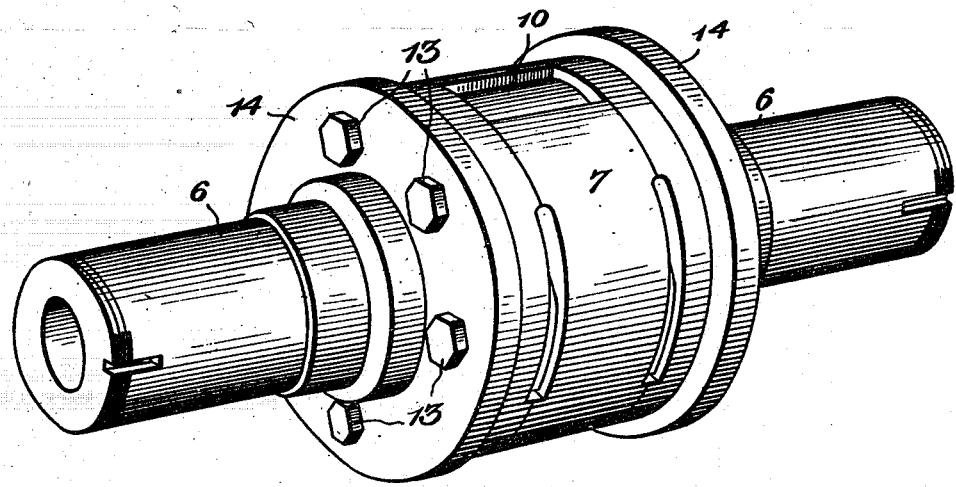
Fig. 5 is a perspective view of the outer driving shaft.
Figure 6:
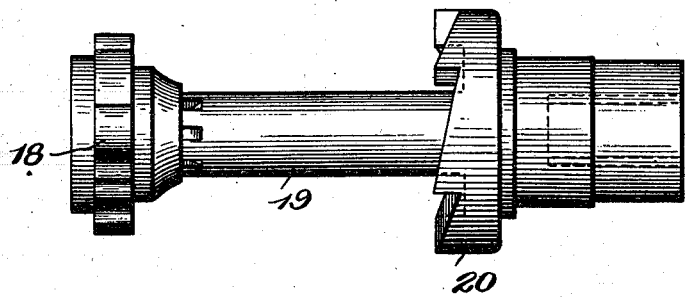
Fig. 6 is an elevation of one half of the inner driving shaft.

The inner ends of the pins 12 are arranged to engage the tails of the pawls 17 when the keys 9 are driving the main shaft forwardly, that is, engage the other ends of the grooves than those they are shown as engaging in Fig. 2, which represents the position of said keys and pawls for reverse drive, or when the momentum of the vehicle causes the wheel shafts to turn faster than the power shaft tends to turn them. By the engagement of said pins with the tails of the pawls on forward drive, the pawls are caused to occupy the seats 27, formed in the flanges 14 and in the central member 7 of the main shaft. Springs 28 throw the pawls into engagement with the teeth of the ratchet wheels, as soon as the gear is reversed, that is, when the keys 9 move to the other end of the grooves, or into the position shown in Fig. 2.

It will be seen that the forward drive is from gear 4, through its hub 5, keys 9, hollow shaft 7, 6, 6, and ratchet clutches 21, 20, to divided shaft 19, 19, and that the reverse drive is from gear 4, through its hub 5, keys 9, hollow shaft 7, 6, 6, pawls 17, and ratchet wheels 18, to shaft 19, 19. In both cases, all the parts turn together as one, so that there is no relative movement and, consequently, no friction. The only times when any relative movement of the parts occurs are: first, when the gear hub turns on the hollow axle, which is only when the power is reversed or when the shaft runs faster than the gear, as when the vehicle is coasting with the power cut off, and such turning movement is only about ⅜ths of an inch; and second, when one wheel turns faster in rounding a curve, which causes one of the ratchet clutches 20 to slip over its corresponding clutch 21, or one of the pawls 17 to slip over its ratchet wheel, and one of the half shafts 19 to turn in the sleeve 6.

It will now be seen that, on reverse drive, the power is transmitted directly from the pawls, carried by the central portion of the outer shaft, to the inner divided shaft, and that, at this time, while the clutches 20, 21, are in engagement and revolve with the shafts, they perform no function; that is, are not transmitting any power. On the other hand, on forward drive, said clutches take all the load and the ratchet wheels turn idly with the shafts. The pawls are, of course, always moved into engagement also whenever the wheel shafts turn faster than the power shaft tends to turn them, but the angular movement of the gear hub on the hollow shaft is so slight that no shock or jar is apparent. Furthermore, in descending a grade, the power being cut off and the driving clutch being left in, the position of the keys 9 and of the pawls 17 is the same as when the vehicle is backing, so that the power shaft is positively connected to the wheels—by the pawls and ratchets—and the motor runs as a compressor, thereby acting as a brake. Finally, should the motor become stalled in ascending a grade, the wheels remain connected to the power shaft through the clutches 20, 21, the position of the keys 9 and of the pawls 17 being then those they occupy on forward drive, so that the motor can again act as a brake and, since both wheels are positively connected to the power shaft, there is no possibility of the rear end of the vehicle slewing around.

Modifications can, of course, be made in the details. For instance, lugs integral with the gear hub can be used in place of the pins 12, or the keys 9 themselves may be the parts which disengage the pawls. It will also be obvious that the pawls and ratchets might be used for the forward drive and the ratchet clutches for the reverse drive.

In either case, since the power, on reverse, as well as on forward drive, is transmitted independently to both wheels, it will always be the inner wheel alone which drives the vehicle on a curve, the outer wheel running freely and having no reactive effect on the inner one, as it has with the ordinary gear differential, so all danger of side or circular skidding is eliminated and one wheel cannot spin without the other.

Having described the invention what is claimed is:—

1. In a driving mechanism for motor vehicles, the combination of a hollow shaft, a divided shaft within the same and connected to the wheels, means connecting said shafts but operable only to transmit power from the outer one to the inner one on forward drive, pawls carried by said outer shaft, ratchets carried by said inner shaft, means to cause engagement between said pawls and ratchets on reverse drive, and means to hold said pawls and ratchets out of engagement on forward drive.

2. A reversible compensating transmission gearing, comprising a divided driven shaft, a hollow driving shaft surrounding the same, driving means on said hollow shaft, an overrunning clutch connecting said hollow shaft to each part of said driven shaft to drive the latter in one direction, an overrunning clutch connecting said hollow shaft to each part of said driven shaft to drive the latter in the other direction, and means, controlled by said driving means, to hold said last mentioned clutches out of engagement when said driving shaft is turning in the first mentioned direction.

3. In a driving mechanism for motor vehicles, the combination with a hollow driving shaft and overrunning means to connect the same to the wheel shafts for forward drive, of a divided shaft for reverse drive mounted within said hollow shaft, a ratchet wheel on the inner end of each half of said divided shaft, pawls carried by said hollow shaft in position to engage said ratchet wheels, means for maintaining said pawls out of engagement during forward drive, and means for causing them to engage said wheels whenever the power is reversed and whenever the inner shaft tends to turn faster than the hollow shaft.

4. In a driving mechanism for motor vehicles, the combination of two driving shafts, one within the other, the inner shaft being centrally divided and connected to the wheel shafts, ratchet clutches connecting said shafts for forward drive, pawl and ratchet mechanism for connecting said shafts for reverse drive, a driving gear mounted on said outer shaft, and having a limited turning movement relative thereto, and connections between said gear and pawls such that the latter are held out of engagement during the forward drive.

5. In a driving mechanism for motor vehicles, the combination with a divided shaft connected at its outer ends to the vehicle wheels, ratchet wheels on the inner adjacent ends of said shaft, a hollow shaft outside said divided shaft and having an enlarged central portion inclosing said ratchet wheels, pawls carried by said hollow shaft to engage said ratchet wheels on reverse drive, a central bearing member forming part of said hollow shaft and having bearings for said pawls, and ratchet clutches connecting said hollow shaft and divided shaft for forward drive.

6. In a driving mechanism for motor vehicles, the combination of a hollow driving shaft, over-running clutches to connect the same to the wheel shafts for forward drive, a driving gear mounted on said shaft so as to have a limited turning movement thereon, a divided shaft for reverse drive mounted within said hollow shaft, a ratchet wheel on the inner end of each part of said divided shaft, a bearing member between said ratchet wheels and forming part of said hollow shaft, pawls journaled in said hollow shaft and bearing member in position to engage said ratchet wheels, and projections carried by the hub of said driving gear and arranged to engage the tails of said pawls and hold them out of engagement during the forward drive.

7. In a driving mechanism for motor vehicles, the combination of a driving shaft composed of two tubular members having flanges on their inner ends and a central member rigidly secured to said flanges, a divided shaft mounted within said tubular members, a ratchet wheel on the inner end of each part of said divided shaft and rotatably held between the flange of the corresponding tubular member and said central member, pawls having trunnions seated in sockets in said flanges and central member respectively, a driving gear mounted on said central member so as to have a limited turning movement thereon, pins carried by said gear in position to engage the tails of said pawls and lift them out of engagement when said gear is driving said hollow shaft forwardly, springs to throw said pawls into engagement on reverse drive, and a ratchet clutch connecting each of said tubular members to one part of said divided shaft and operable only on forward drive.

8. A reversible compensating transmission gearing, comprising a two-part shaft, each part of which is rigidly connected to the load, a hollow shaft surrounding the same, reversible means to drive said hollow shaft, means connecting said shafts operable to drive the inner shaft in one direction, independent means to connect said shafts to drive the inner shaft in the other direction, and means to automatically disconnect said last mentioned means when the shafts are driven in the first mentioned direction.

9. A rear axle compensating drive for motor vehicles, comprising in combination a two-part shaft each part of which is rigidly connected to one of the wheels, a hollow shaft surrounding said two-part shaft, a driving gear mounted on said hollow shaft so as to have a limited turning movement thereon, a ratchet clutch member fast on each part of said two-part shaft, coöperating ratchet clutch members slidably mounted on the ends of said hollow shaft, a ratchet wheel fast on the inner end of each part of said two-part shaft, the teeth of said ratchet wheels facing in the opposite direction to those of said ratchet clutches, pawls carried by said hollow shaft in position to engage said ratchet wheels, and means carried by said gear to hold said pawls out of engagement when the power is being transmitted through said ratchet clutches.

10. In a driving mechanism for motor vehicles, the combination of a two-part shaft connected to the wheels, a ratchet clutch member fast on each part of said shaft intermediate its ends, a ratchet wheel fast on the inner end of each said part, a hollow shaft surrounding said two-part shaft and comprising two sleeve members, having flanges at their inner ends, and a central member bolted to said flanges, the latter and said member having circular shoulders serving as bearings for said ratchet wheels, and pawls journaled in said central member and flanges in position to engage said ratchet wheels.

11. In a driving mechanism for motor vehicles, the combination of a hollow shaft, a driving gear mounted to turn on said shaft, said gear and shaft having shoulders to limit the turning movement of the former on the latter, a divided shaft within said hollow shaft and connected to the vehicle wheels, ratchet wheels on the adjacent ends of said divided shaft, on said hollow shaft and ratchet wheels, having circular shoulders constituting bearings for said wheels, overrunning means to connect said hollow shaft to said divided shaft to drive the latter in one direction, pawls carried by said hollow shaft to engage said ratchet wheels to drive said divided shaft in the other direction, and projections on said gear to raise said pawls out of engagement when the shafts are driven in the first mentioned direction.

12. In a compensating driving mechanism for motor vehicles, the combination of a hollow shaft, a gear carried thereon so as to have a limited relative angular movement, two ratchet wheels within said shaft each rigidly connected to one of the vehicle wheels, a ratchet clutch member rigidly connected to each of said ratchet wheels, coöperating clutch members slidably carried by said shaft and yieldingly held in engagement with said ratchet clutch members for the drive in one direction, pawls carried by said shaft and yieldingly held in engagement with said ratchet wheels for the drive in the other direction, and means carried by said gear to hold said pawls out of engagement when the drive is in the first mentioned direction.

In testimony whereof I have hereunto set my hand.

JOHN D. ALLEN.

Witnesses:
MARY E. HAMER,
HARRY H. ALLEN.